(12) United States Patent
Kosta

(10) Patent No.: US 6,257,823 B1
(45) Date of Patent: Jul. 10, 2001

(54) RIDER ORIENTED AND OPERATOR ORIENTED IMPROVEMENTS IN TOW TRUCKS

(76) Inventor: Peter William Kosta, 11950 SE. Holgate, Portland, OR (US) 97266

( * ) Notice: Subject to any disclaimer, the term of this patent is extended or adjusted under 35 U.S.C. 154(b) by 0 days.

(21) Appl. No.: 09/205,517

(22) Filed: Dec. 4, 1998

Related U.S. Application Data (60) Provisional application No. 60/093,176, filed on Jul. 17, 1998.

(51) Int. Cl.$^7$ ................................................ B60P 3/12
(52) U.S. Cl. ........................................... 414/563; 296/183
(58) Field of Search .................................. 414/558, 563, 414/921, 542, 543; 296/146.4, 183; 280/166; 182/127

(56) References Cited

U.S. PATENT DOCUMENTS

| | | | |
|---|---|---|---|
| D. 153,085 | * 3/1949 | Powers . | |
| 2,951,601 | * 9/1960 | Castoe ................................ | 414/563 |
| 3,032,217 | * 5/1962 | Musson et al. . | |
| 3,448,875 | * 6/1969 | Robinson, Jr. ...................... | 414/542 |
| 3,861,713 | * 1/1975 | McKee ................................ | 280/166 |
| 4,214,771 | * 7/1980 | Mason ................................ | 414/563 X |
| 4,556,248 | * 12/1985 | Kobayashi .......................... | 296/183 |
| 4,570,962 | * 2/1986 | Chavira .............................. | 280/166 |
| 4,700,852 | * 10/1987 | Mjoberg .............................. | 414/563 X |
| 5,178,432 | * 1/1993 | Zeman et al. ...................... | 296/183 X |
| 5,245,930 | * 9/1993 | Williams ............................ | 104/120 |
| 5,388,937 | * 2/1995 | Farsai ................................ | 414/921 X |
| 5,577,793 | * 11/1996 | Kobasic ............................ | 296/146.4 |
| 5,584,493 | * 12/1996 | Demski et al. ...................... | 280/166 |
| 5,755,309 | * 5/1998 | Harman et al. ..................... | 414/921 X |
| 5,839,775 | * 11/1998 | Young et al. ....................... | 296/183 |
| 6,065,798 | * 5/2000 | Sankrithi .......................... | 296/183 |
| 6,102,648 | * 8/2000 | Fretwell et al. .................... | 414/558 X |

FOREIGN PATENT DOCUMENTS

2658134 * 8/1991 (FR) ..................................... 414/563

* cited by examiner

*Primary Examiner*—James W. Keenan
(74) *Attorney, Agent, or Firm*—Marger Johnson & McCollom, PC; Gregory T. Kavounas (57) ABSTRACT

An improved tow truck is provided, that includes special accommodations for the former occupants of the stranded vehicle, and ergonomic improvements for the tow truck operator. The tow truck provides an additional rider compartment that includes a passenger door, foldable seats, floor tracks and brackets for restraining a wheelchair. The rider compartment is preferably a rider cabin that is distinct from, but communicates with the driver cabin. The tow truck further includes an automated ladder with deployable steps and/or a wheelchair lift with a deployable platform, both for serving the rider compartment. These are operated electronically, and are preferably coordinated to work in unison with opening and closing the passenger door. Ergonomic improvements include an enclosure around the boom that defines a space for secure storage of miscellaneous equipment. The storage space is accessed through utility openings that are closeable by shutters, which can be locked. Work lights and a video camera are advantageously provided to the exterior of the enclosure. A slidable shelf is custom made to receive towing dollies. A lockable cover prevents access to the dollies and thus prevents theft.

16 Claims, 8 Drawing Sheets

RIDER ORIENTED AND OPERATOR ORIENTED IMPROVEMENTS IN TOW TRUCKS

CROSS REFERENCE TO RELATED APPLICATIONS

This application claims the benefit of U.S. Provisional Application No. 60/093,176, filed on Jul. 17, 1998, titled "IMPROVEMENTS IN TOW TRUCKS".

BACKGROUND OF THE INVENTION

1. Field of the Invention

The present invention is related to the field of tow trucks for towing stranded vehicles, and more particularly to improvements in the human side of riding and operating tow trucks, including capability of accommodating handicapped passengers and secure storing equipment on board.

2. Description of the Related Art

Figure 1:
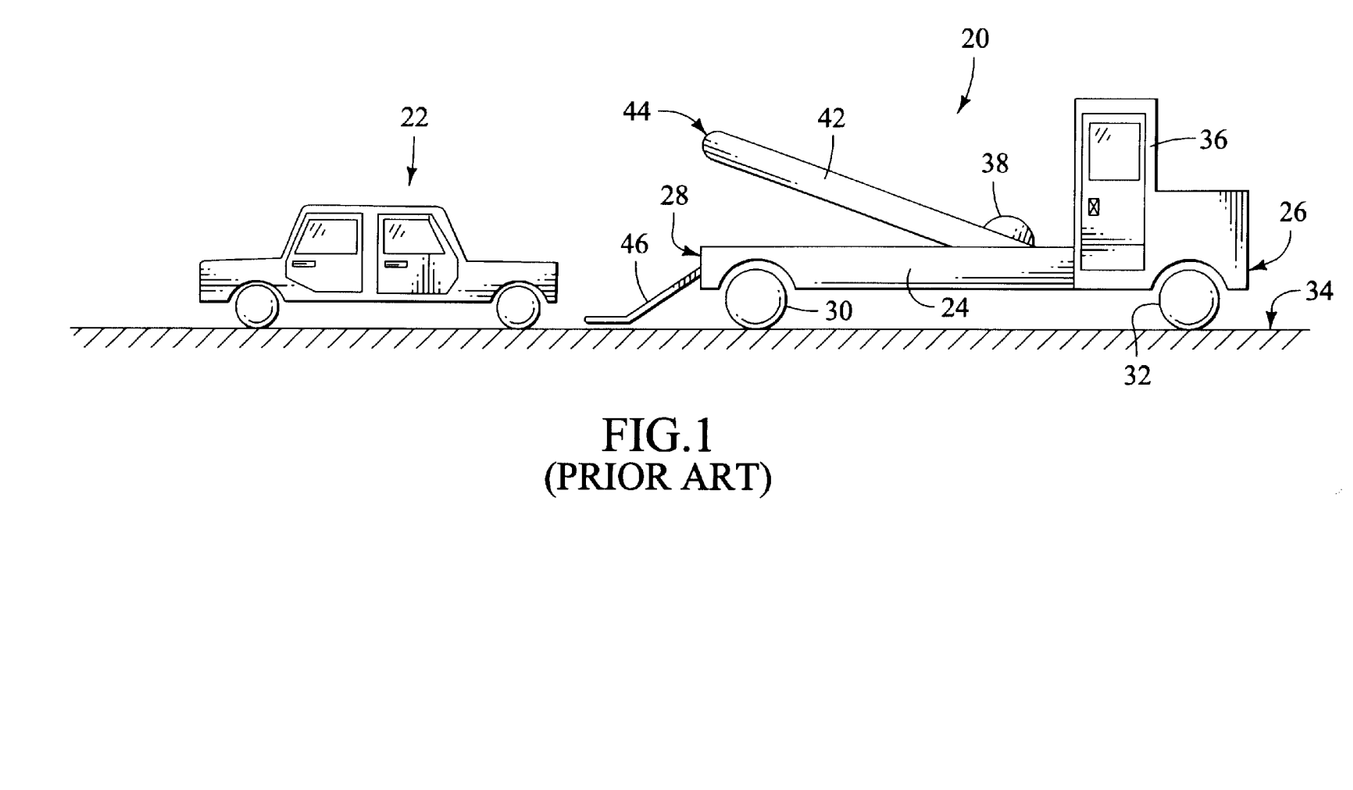
FIG. 1 illustrates a tow truck in the prior art close to a stranded vehicle.

Tow trucks are becoming increasingly sophisticated as to how they tow a stranded vehicle. Referring to FIG. 1, a prior art tow truck 20 is described for towing a stranded vehicle 22. The stranded vehicle can be an automobile or a truck, etc. The tow truck has a frame 24 (also known as chassis), that is typically made of steel. The frame has a front end 26 and a rear end 28. The tow truck has at least two pairs of wheels 30, 32. The wheels of each pair are joined by an axle that is rotatably coupled to the frame. The wheels support the frame above ground level 34.

Tow truck 20 included a driver cabin 36 for accommodating a tow truck operator (also known as driver). Truck 20 also typically includes a winch 38 (also known as pulley) for initially lifting the stranded vehicle for engagement by the tow truck.

Tow trucks can be of different varieties. The one of FIG. 1 (also known as regular type or van type or wheel lift type) has a boom 42 that supports a pulley 44. Pulley 44 is thus used for initial raising of one end of the stranded vehicle from the ground level, and thus raising the corresponding wheels. The tow truck also has a wheel lift 46 (also known as a lifting unit) for engaging the raised wheels. The wheel lift is movably attached to rear end 28 of the frame.

There are also other types of tow trucks. For example, a wrecker type truck is like a regular type, but the boom is much shorter, and attached to the rear of the frame. Another type of tow truck is known as the "flatbed" type, and has no boom. In that embodiment the stranded vehicle is loaded completely onto a "flat bed" at the rear of the tow truck.

Progress seems focused in better engaging and towing of the stranded vehicle. However, no progress is made as to the human side of using tow trucks. The human side includes how the former occupants of the stranded vehicle are transported, and how easily these trucks are operated.

Regarding the former passengers, these people currently ride with the tow truck driver in driver cabin 36, which is problematic. If they are more than two, they do not fit in the driver cabin, and thus have to summon a second vehicle, such as a taxi.

Even getting into cabin 36 is not easy. The cabin is high above the ground level, and requires scaling small distant steps, which are designed primarily for agile tow truck drivers. Where the rider is elderly, not agile, or handicapped (e.g. confined to a wheel chair), getting into cabin 36 is very difficult.

Another problem with using tow trucks is that miscellaneous equipment needs to be put on the tow truck for use during the day. A specific example is dollies used for towing (also known as towing dollies). If the equipment needs to be removed for night storage, much time is wasted. In addition to the above, the towing dollies in particular are typically carried and placed in a location on the top side of frame 24. This requires lifting them manually, which is difficult because they are heavy.

BRIEF SUMMARY OF THE INVENTION

The present invention overcomes these problems and limitations of the prior art.

Generally, the present invention provides an improved tow truck featuring special accommodations for the former occupants of the stranded vehicle, and ergonomic improvements for the tow truck operator including on board space for secure storage of equipment.

More specifically, the preferred embodiment of the present invention provides an additional rider compartment that includes a passenger door, foldable seats and wheelchair restraint means. The rider compartment is preferably a rider cabin that is distinct from, but communicates with the driver cabin.

The tow truck further includes automated boarding means for serving the rider compartment. The boarding means includes a ladder with deployable steps or a wheelchair lift means with a deployable platform. These are operated electronically, and are preferably coordinated to work in unison with opening and closing the passenger door.

Advantages of this invention include that the former occupants of a stranded vehicle can board the tow truck easily and with dignity. They can ride with comfort and a modicum of privacy.

The preferred embodiment of the present invention for a tow truck that has a boom further includes an enclosure around the boom, with a boom opening for access of the boom therethrough. Work lights and a video camera are advantageously attached to the exterior of the enclosure, for use by the tow truck driver.

The enclosure defines an enclosed on board storage space for storing miscellaneous equipment. The storage space is accessible by utility openings that are closeable by shutters which can be locked.

An advantage of this feature of the invention is that equipment can thus be stored on the tow truck, without the fear of theft. This eliminates any need that this equipment be removed at night for secure storage.

The preferred embodiment of the present invention further provides a shelf attached slidably to the frame of the tow truck, for storing on it towing dollies. The shelf is provided at a low level; the dollies thus do not need to be lifted high for on board storage. A lockable cover prevents access to the dollies and thus prevents theft.

These and other features and advantages of the present invention will become apparent and more appreciated after consideration of the Drawing(s) and Detailed Description of the Preferred Embodiment(s) of the invention.

DETAILED DESCRIPTION OF THE PREFERRED EMBODIMENT(S) OF THE INVENTION

As has been mentioned, the present invention provides improvements for tow trucks. It will be obvious that a tow truck according to the invention may incorporate all or only some of the improvements disclosed herein. The improvements can be incorporated at the time of manufacture, or by retrofitting an existing tow truck, as will be obvious to a person skilled in the art.

It will be also obvious that the improvements described herein are applicable to all types of tow trucks, (regular or van type, wrecker, flatbed, etc.). That is also why similar reference numbers are used for the basic parts of a tow truck (e.g. 24 for the frame), regardless of the specific type of tow truck.

The present invention provides a tow truck with a rider compartment intended for use by the former occupants of the stranded vehicle, while the latter is being towed. In addition, special means are provided for boarding the rider compartment.

Figure 2:
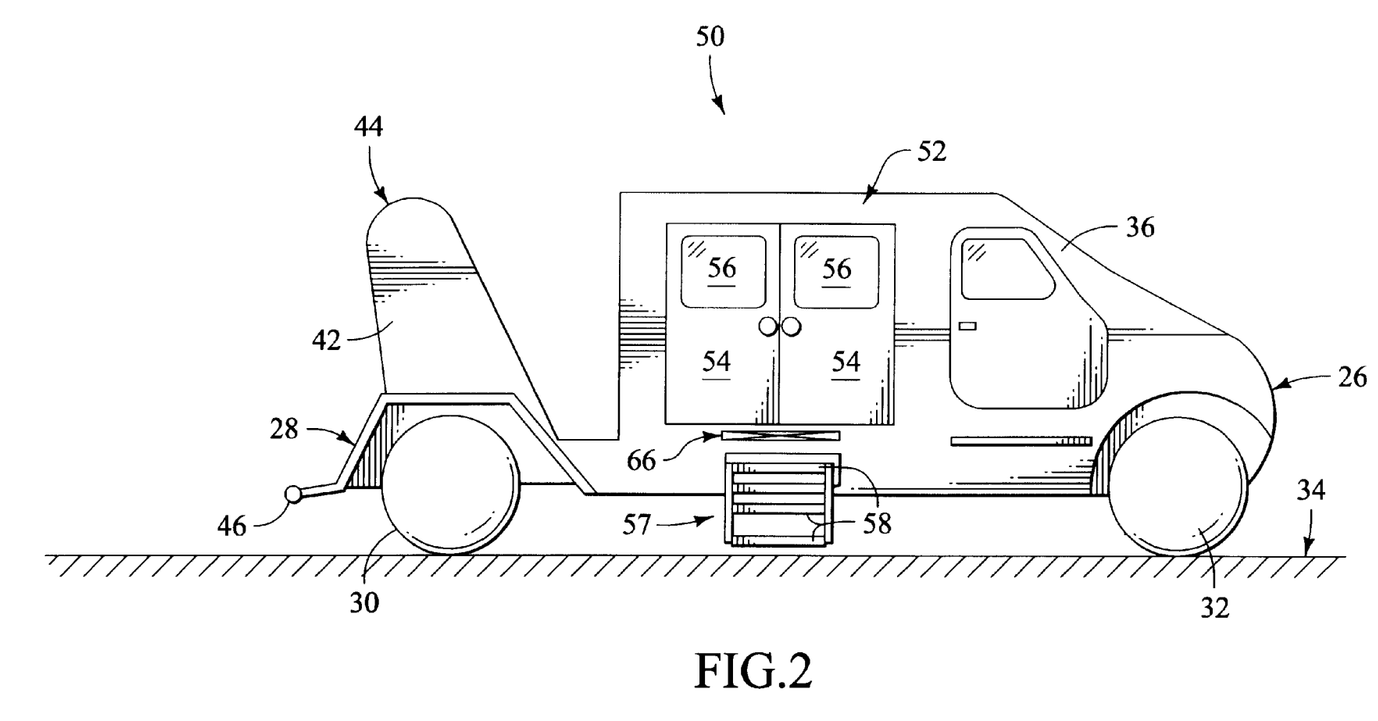
FIG. 2 is a side view of a wrecker type tow truck according to the present invention with a rider compartment, a wheelchair lift means with its platform retracted for stowage, and a ladder with its steps deployed for use.

Referring to FIG. 2, in a tow truck 50 a rider compartment 52 is implemented as an extension of driver cabin 36. The rider compartment is thus attached to frame 24. Compartment 52 has two passenger doors 54. It is highly preferred that doors 54 are at the right side of the tow truck, so that it opens to the pavement, not the road. Compartment 52 preferably has at least one window 56, optionally as part of each door 54. The window is slidable open, to allow ventilation as desired by the rider.

Additionally, the invention provides boarding means for serving the rider compartment. The boarding means is preferably automated, as described below.

The boarding means includes a ladder 57 (also known as stair 57) that is movably coupled with the frame. While the ladder is permanently attached to the frame, it includes steps 58 that are deployable for use. When deployed, the ladder serves a level associated with compartment 52 (such as a level of the floor of the compartment in front of the door), and another level below that (such as ground level 34). The steps are preferably retractable for stowing.

The ladder can be movable manually, or automatically using power from the tow truck. An automated ladder that works well is commercially available under the brand name "Kwikee" Automatic Folding Steps. When deployed, the steps extend out from the frame and downwards towards the ground.

When the ladder is moveable automatically, its movement can be controlled by a separate switch. Preferably the ladder is also wired to sense the state of door 54. This is implemented by incorporating a switch in the door, etc. This way the movement of the ladder is also controlled by opening and closing the door. The ladder is preferably wired such that the steps are deployed automatically when the door is opened, and retracted automatically when anyone closes the door.

Figure 3:
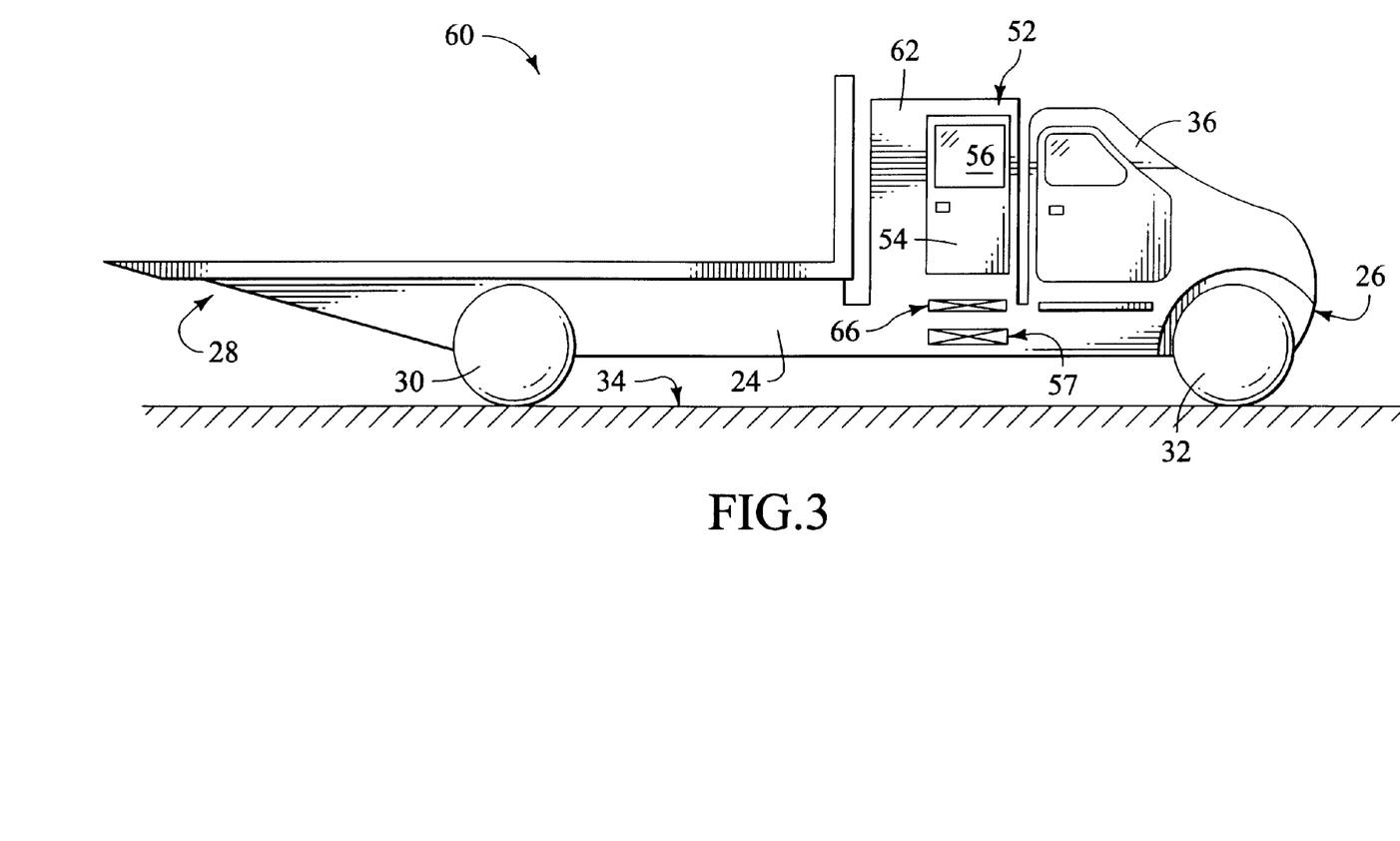
FIG. 3 is a side view of a flatbed tow truck according to the present invention with a separate rider cabin, a ladder with its steps retracted for stowage, and a wheelchair lift means with a platform in the stowed position.

Referring to FIG. 3, a tow truck 60 according to the invention is described. Rider compartment 52 has a single door 54, and is implemented as stand alone rider cabin 62, distinct from driver cabin 36. Whether the rider compartment is a stand alone rider cabin or not, it meets or exceeds all U.S. A.D.A., State and Federal regulations mandated for transporting people. An air chuck outlet provides ventilation.

In FIG. 3 ladder 57 is shown with its steps retracted. As seen, the ladder is preferably stowed by retracting the steps into a suitable receiving opening under the rider compartment, and also preferably under door 54.

Figure 4:
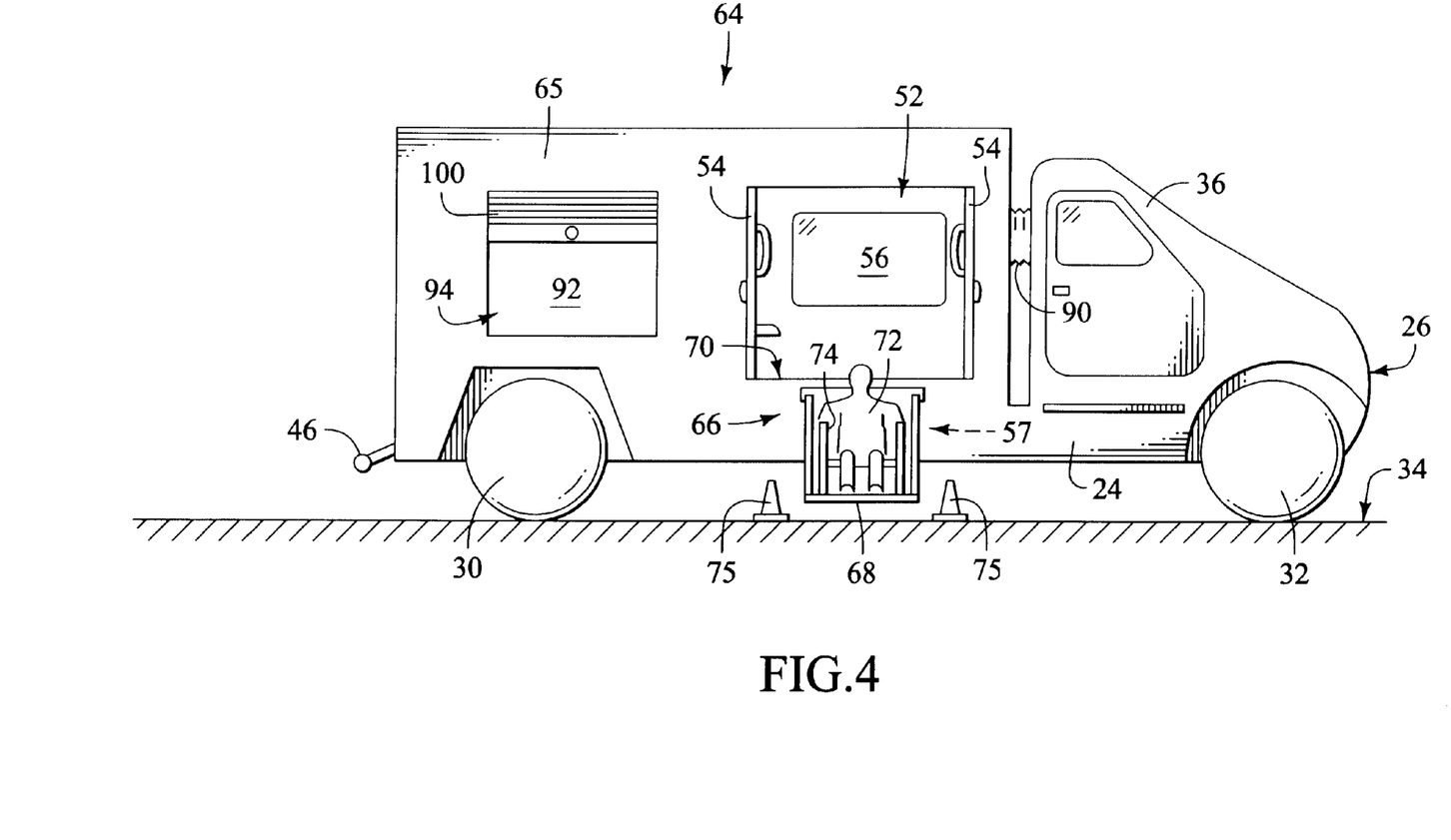
FIG. 4 illustrates a wrecker type tow truck adapted according to the present invention with a rider cabin with open doors, a wheelchair lift means with a platform deployed to serve a person in a wheelchair, and an enclosure surrounding the boom with a utility access opening that is partially open.

Referring to FIG. 4, another tow truck 64 according to the invention is shown. It has a rider compartment 52 implemented integrally as a singe construction with a rear enclosure 65 that is described below, which is preferred but not necessary. In addition, doors 54 are open, revealing the interior of rider compartment 52.

The boarding means preferably further includes a wheelchair lift means 66 that is movably coupled with the frame. While permanently attached to the frame, the wheelchair lift means includes a platform 68 that is deployable to serve the rider compartment. Deployment typically includes a movement outward from the tow truck and then an up and down movement.

Movement outward from the tow truck can be in a number of ways. The platform can be rotated out by revolving around a vertical pole found in the rider compartment. Alternately, (as seen by referring briefly back to FIG. 3), wheelchair lift means 66 is collapsible, and when in the collapsed state it is retractable into a suitable receiving opening in the frame under the door by being moved straight in.

Once moved outward from the tow truck, the platform is moved vertically up and down. It reaches up enough to serve a level associated with the rider compartment, such as level 70 of its floor. It reaches also down to ground level 34. This way a person 72 in a wheel chair 74 can use means 66 to board rider compartment 52 of the tow truck of the invention. It can also be used by a person having a hard time with the steps.

It is recommended to define a safety zone around the platform for a person to not be apprehensive about boarding. This can be created by laying out emergency cones 75 (usually orange colored).

Wheelchair lift means 66 can be movable manually, e.g. by lever means, or automatically using hydraulic components and power from the tow truck. An automated model that works well is made commercially available by Braun under the name Model UVL 850 Wheelchair Lift.

In FIG. 4 the platform is deployed and thus obstructs view of the ladder (which is retracted as also in FIG. 3). When the platform is moved automatically, its movement can be controlled by a separate switch. It can be further wired to respond to opening and closing of doors 54, similarly to the ladder. In addition, if doors 54 are served by both a ladder and a wheelchair lift means, then preferably a mechanism prevents the two from being deployed at the same time. This prevents them from running into each other. The mechanism can be implemented by appropriate control electronics, etc.

Still referring to FIG. 4, a large window 56 can be implemented as a kickout window, for emergency exit. Alternately, compartment 52 preferably has another emergency exit, such as an additional door on the other side of the rider compartment, an escape hatch, etc.

Figure 5:
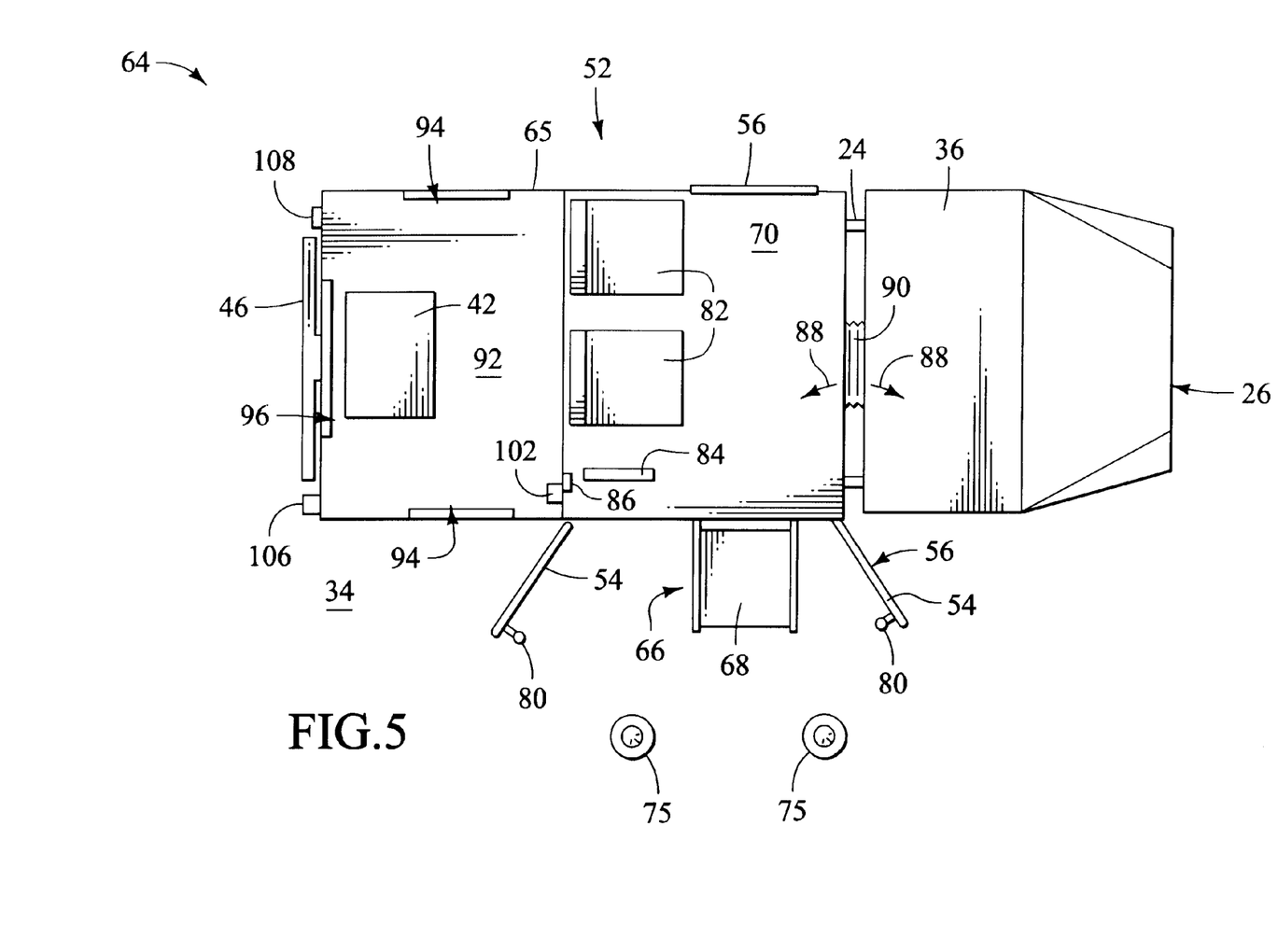
FIG. 5 is a section of the tow truck of FIG. 4 seen from the top, and further showing the interior of the rider compartment and of the enclosed storage space.

Referring now to FIG. 5, doors 54 have vertical handle bars 80 for support during ingress and egress from the rider compartment. Inside, the rider compartment has lighting and wall to wall carpet for a comfortable feel. There is provided at least one seat 82 for the driver of the stranded vehicle. Preferably two seats are provided, all with seatbelts and facing forward. The seats can be the fold-up type, to make room for at least one wheelchair, preferably two. In addition, the rider compartment has wheelchair restraint means, such as floor tracks 84, wall brackets 86, etc. Wheelchairs of passengers are securable facing preferably forward.

The rider compartment preferably communicates with the driver cabin. When implemented as separate cabins, communication can be in a number of ways, such as by intercom means. Alternately, one or more cutouts are provided at window height, such as according to arrow 88. The cutouts are joined by an elastic tube 90, made for example by neoprene boot 90. The tube is of short length and relatively large cross sectional area.

The invention further provides a rear enclosure 65, also known as simply enclosure. The enclosure is attached to the frame and surrounds at least a portion of boom 42 (and preferably all of it). The enclosure defines an enclosed storage space 92. Space 92 is usable for safe storage of miscellaneous equipment, such as the emergency cones. It is preferably provided with adjustable shelves and interior lights.

Space 92 is accessible by utility openings 94. An opening 96 at the rear is called the boom opening. The openings are closeable by shutters 100 that are preferably vertically sliding (also known as grills and rollups), and lockable. ROM Robinson shutters are recommended. Each shutter is preferably wired to a switch such that, when it is opened, it turns on automatically proximately located interior lights.

Storage space 92 is an ideal place for locating a switch 102 that operates the ladder and the wheelchair lift means. From there the switch is accessible through the lockable utility opening at the right side, and thus only by the tow truck driver. The switch can further be provided at the end of a long wire, so that the operator can remove it from space 92, and be closer to the wheelchair lift means while operating it.

Figure 6:
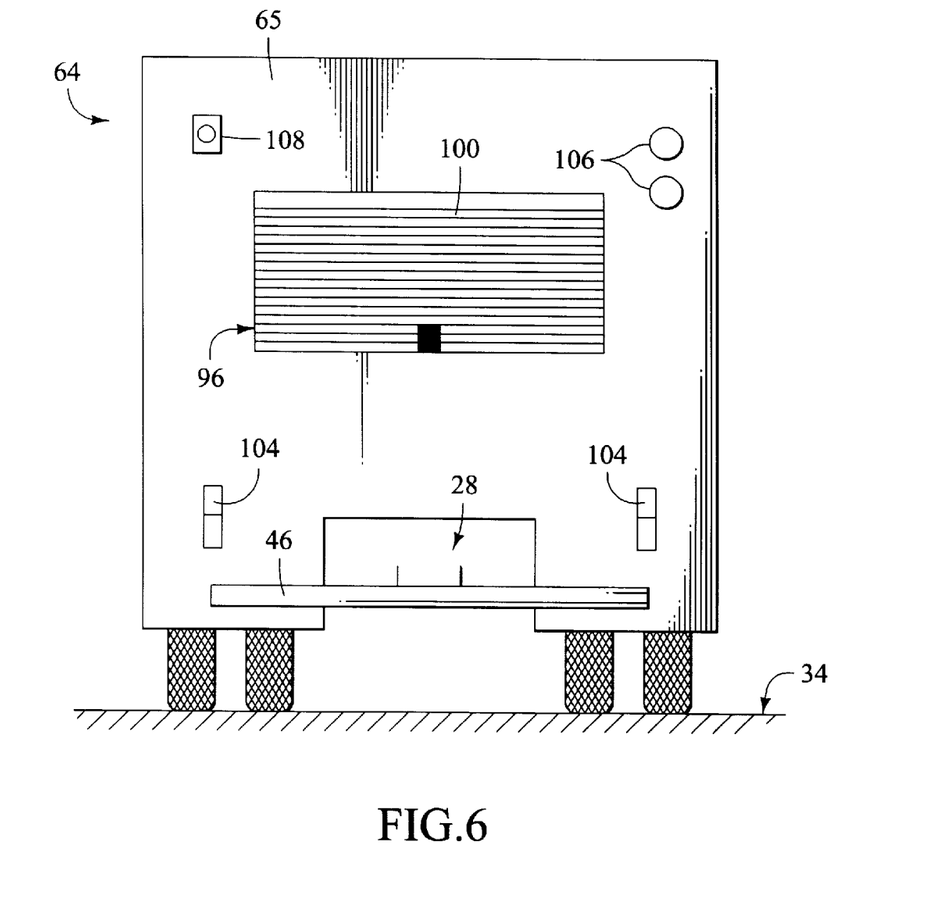
FIG. 6 is a rear view of the tow truck of FIG. 4, with the boom opening closed by a shutter, but with the door of the rider cabin closed and the platform in the stowed position.

Referring to FIG. 6, the exterior of the enclosure features traffic lights 104. The invention further provides ergonomic features such as one or more work lights 106, and a video camera 108 for viewing the stranded vehicle. The video camera is fixedly attached to the tow truck, such that it is positioned fixedly with respect to the frame. A video screen in the driver cabin (not shown) facilitates backing up the tow truck, and thus positioning it with respect to the stranded vehicle such that the subsequent engagement is optimized.

Referring to FIGS. 4, 5 and 6, enclosure 65 is made integrally with rider compartment 52. The enclosure is thus attached to the rider compartment. The combined structure is preferably made from metal for structural strength. Aluminum is highly preferred for its light weight. The combined structure can be of a "unit weld design", and constructed from 5052-H32 flat sheet aluminum in the following manner:

a) 0.080 aluminum for the side sheets;
b) 0.188 aluminum for the flooring (with a plywood cap);
c) 0.125 aluminum for the headers and ribs for structural integrity.

The subframe can be constructed with aluminum tubing crossmembers, set perpendicularly to the chassis. The subframe can be mounted onto the frame by means of 3/16 formed gussets, that are welded to the subframe crossmembers and then bolted to the frame. Dielectric insulating tape can be installed between the chassis and the subframe to prevent corrosion and electrolysis caused from the dissimilar metals (aluminum and steel).

Figure 7:
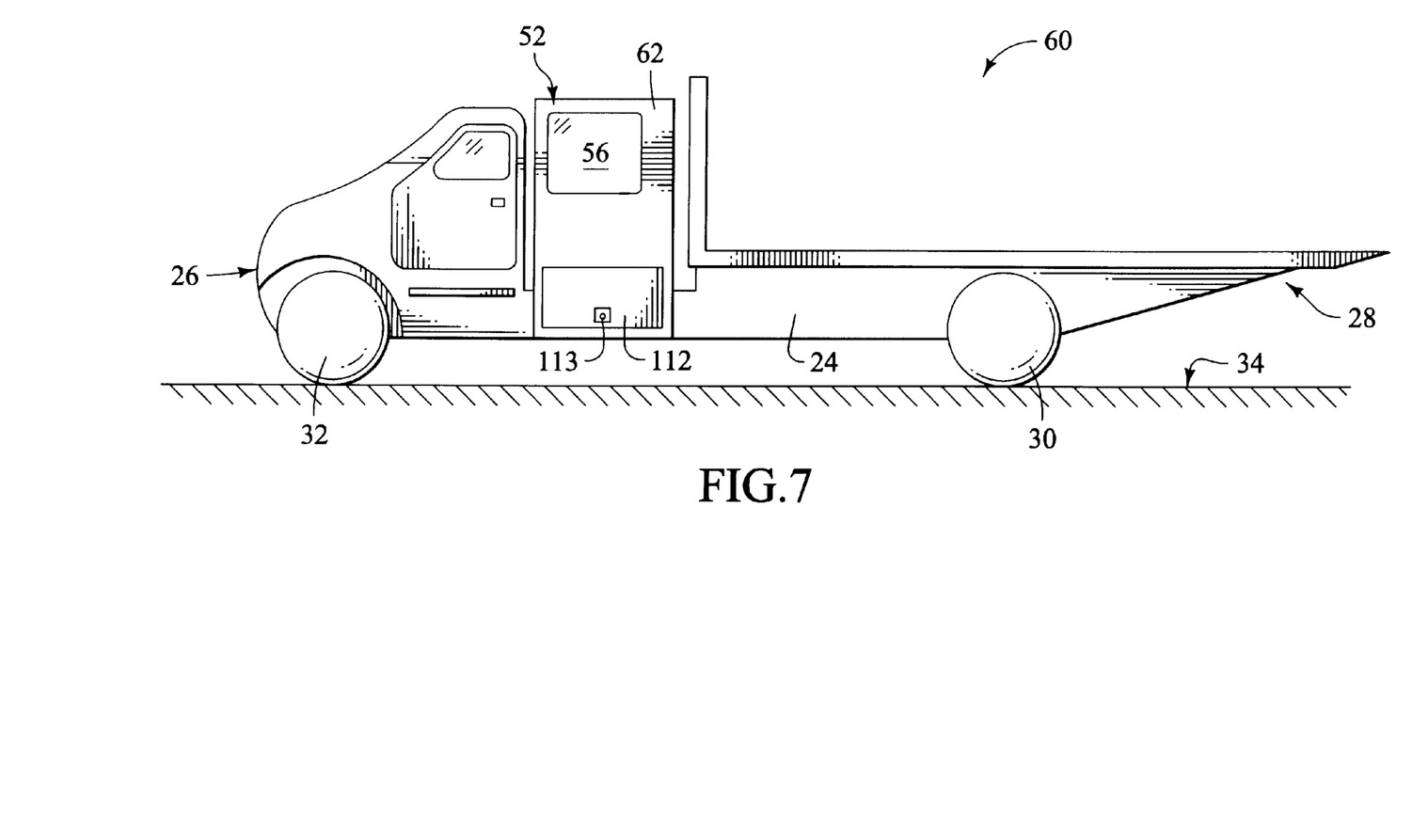
FIG. 7 is a side view of the opposite side of the tow truck of FIG. 3, further showing the cover of a dolly storage unit of the present invention in the stowed position.

Referring to FIG. 7, the invention further provides a special dolly storage unit for storing a towing dolly at waist level. The dolly storage unit preferably includes a closeable cover 112, that prevents access to the dolly stored behind it. Cover 112 is part of either the frame or the shelf (described below), and preferably locks with the frame, with a lock 113.

Figure 8:
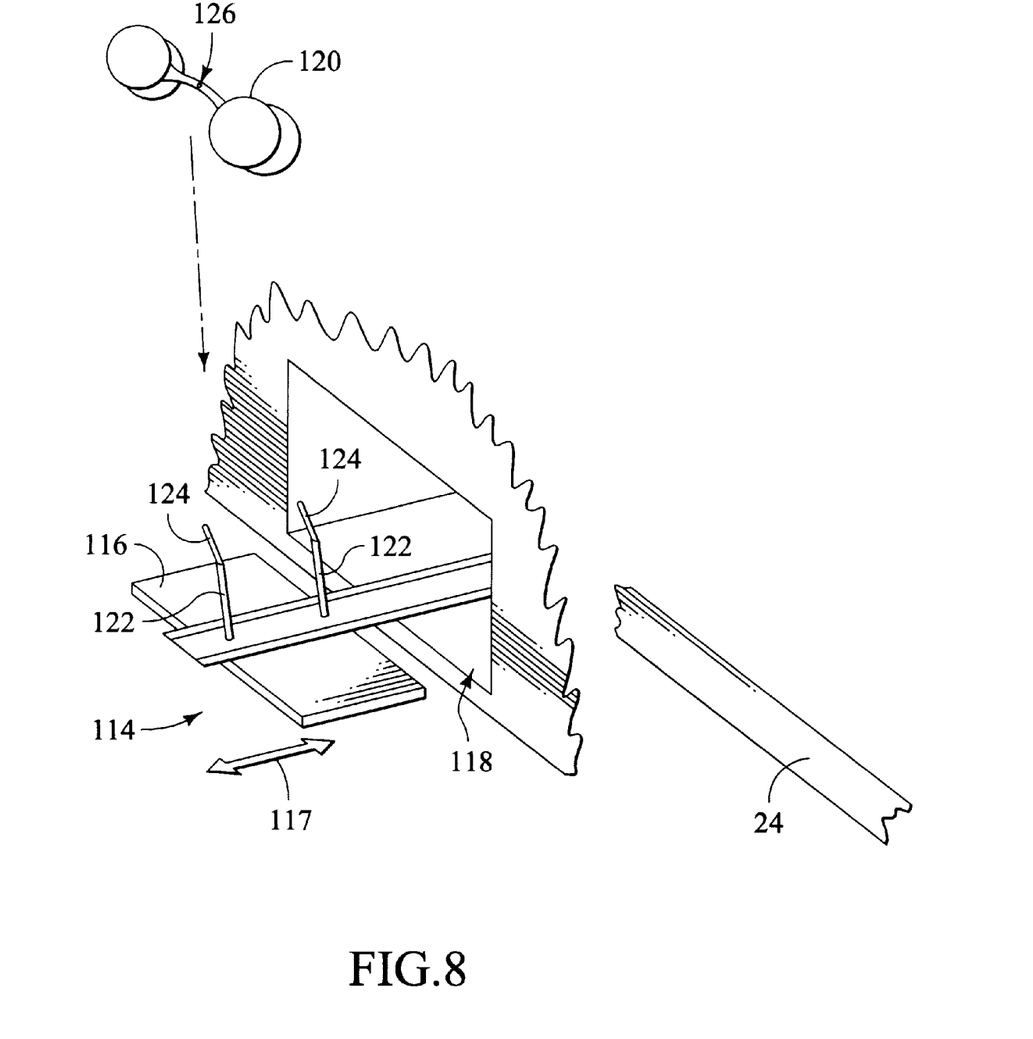
FIG. 8 illustrates a slidable shelf used for storing a towing dolly of the tow truck of FIG. 7, the shelf being in its extended position.

As can be seen in FIG. 8, dolly storage unit 114 of the invention comprises a shelf 116 that is slidably attached to frame 24 of a tow truck. When slid parallel to arrow 117, the shelf has a closed position and an extended position. When pulled out, the shelf emerges from an opening 118. When pushed in to the closed position, the shelf is securable. In addition, the shelf is closeable with the above described cover and lockable. (The cover of FIG. 7 is not shown in FIG. 8 for clarity).

Shelf 116 is adapted for receiving two dollies. Each dolly 120 is mounted on the shelf, which means that the user does not have to lift it higher than his waist. The shelf can be sized to receive each dolly exactly, so that the latter will not wobble during travel, or come loose.

The dolly storage unit of the invention preferably also has means for securing the towing dollies in place. Many possibilities are available. One such possible locking means is a post 122 (also known as guide post) for each dolly, with an optional key 124 at the end. The dolly is placed with a hole 126 receiving post 122 therethrough. Then the key is moved with respect to the post to secure it.

In the present description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily present invention. Again, one skilled in the art will appreciate that it is possible to make various modifications, additions and substitutions to the present description without departing from the scope and spirit of the invention as claimed in the accompanying claims.

The invention claimed is:

1. A tow truck for towing a stranded vehicle comprising:
a frame;
transporting means attached to the frame for transporting the stranded vehicle by lifting at least two of the wheels of the stranded vehicle from a ground;
a least one rider compartment attached to the frame for accommodating a former occupant of the stranded vehicle;
a wheelchair lift means coupled with the frame, the wheelchair lift means having an automatically moveable substantially horizontal platform for serving a first level associated with a floor of the rider compartment and a second level associated with the ground; and a ladder movably coupled with the frame, the ladder including at least one step that is deployable for serving a third level associated with the rider compartment and a fourth level lower than the third level, the step being further retractable for stowage.

2. The tow truck of claim 1, wherein the platform is deployable for use and retractable for stowage.

3. The tow truck of claim 1, wherein the platform is stowed under the rider compartment.

4. The tow truck of claim 1, wherein the platform is controllable by a switch.

5. The tow truck of claim 1, wherein the rider compartment includes a passenger door, and wherein the wheelchair lift means and the passenger door are coupled such that, if the platform is deployed when the passenger door is open, when the passenger door is closed the platform is automatically retracted.

6. The tow truck of claim 1, wherein the rider compartment includes wheelchair restraint means.

7. The tow truck of claim 1, wherein the rider compartment includes foldable seats.

8. The tow truck of claim 1, wherein the platform is deployable for use and retractable for stowage, and further comprising a mechanism for preventing the platform from being deployed at the same time as the ladder step.

9. The tow truck of claim 1 further comprising a driver cabin attached to the frame for accommodating a tow truck driver, and wherein the rider compartment is separated from the rider cabin by at least one wall.

10. The tow truck of claim 9, wherein the rider cabin communicates with the driver cabin through an opening in the wall.

11. The tow truck of claim 1, wherein the ladder is stowed under the rider compartment.

12. The tow truck of claim 1, wherein the ladder is controllable by a switch.

13. The tow truck of claim 1, wherein the rider compartment includes a passenger door, and wherein the ladder and the passenger door are coupled such that, if the ladder step is retracted when the passenger door is closed, when the passenger door is opened the ladder step is automatically deployed.

14. The tow truck of claim 1, wherein the rider compartment includes a passenger door, and wherein the ladder and the passenger door are coupled such that, if the ladder step is deployed when the passenger door is open, when the passenger door is closed the ladder step is automatically retracted.

15. A tow truck for towing a stranded vehicle comprising:

a frame;

a driver cabin attached to the frame for accommodating a tow truck driver;

a boom mounted on the frame for lifting an end of the stranded vehicle;

a lifting unit movably attached to the frame for engaging wheels of the stranded vehicle;

an enclosure attached to the frame, surrounding at least a portion of the boom and defining an enclosed storage space, the enclosure including at least one boom opening for allowing use of the boom therethrough, and at least one utility opening for accessing the storage space;

at least one rider cabin distinct from the driver cabin attached to the frame for accommodating a former occupant of the stranded vehicle, the rider cabin including a passenger door;

a wheelchair lift means movably coupled with the frame for serving a first level associated with the rider cabin and a second level lower than the first level, the wheelchair lift means including a platform that is deployable for use and retractable for stowage;

a ladder movably coupled with the frame, the ladder including at least one step that is deployable for serving a third level associated with the rider cabin and a fourth level lower than the third level, the ladder step further being retractable for stowage; and a mechanism for preventing the platform from being deployed at the same time as the ladder step, wherein the ladder and the passenger door are coupled such that, if the ladder step is retracted when the passenger door is closed, when the passenger door is opened the ladder step is automatically deployed.

16. The tow truck of claim 15, wherein the enclosure is attached to the rider cabin and further comprising a work light attached to an exterior of the enclosure.

* * * * *